(12) United States Patent
Ko

(10) Patent No.: US 6,683,842 B2
(45) Date of Patent: Jan. 27, 2004

(54) GUIDING MECHANISM FOR SUPPORTING A READING-HEAD MOVING WITHIN A OPTICAL STORAGE CARRIER PLAYER

(75) Inventor: Chun-Yi Ko, TaoYuan (TW)

(73) Assignee: Acer Communications & Multimedia Inc., Taoyuan (TW)

( * ) Notice: Subject to any disclaimer, the term of this patent is extended or adjusted under 35 U.S.C. 154(b) by 153 days.

(21) Appl. No.: 09/915,507

(22) Filed: Jul. 27, 2001

(65) Prior Publication Data

US 2002/0136152 A1 Sep. 26, 2002

(30) Foreign Application Priority Data

Mar. 22, 2001 (TW) ........................................ 90204323 U

(51) Int. Cl.⁷ .............................................. G11B 21/16
(52) U.S. Cl. ........................ 369/249; 369/215; 369/219
(58) Field of Search ................................ 369/215, 219, 369/249

(56) References Cited

U.S. PATENT DOCUMENTS

| 4,974,222 A | * 11/1990 | Ishitoya et al. ............. 369/215 |
| 5,982,735 A | * 11/1999 | Tsai ............................. 369/219 |
| 2001/0022772 A1 | * 9/2001 | Moriyama ................... 369/249 |

* cited by examiner

Primary Examiner—William Korzuch
Assistant Examiner—Mark Blouin
(74) Attorney, Agent, or Firm—Troxell Law Office PLLC

(57) ABSTRACT

A guiding mechanism, comprising: at least one guiding rod, at least one base and a fastening device. The guiding rod can provide a reading head of optical storage carrier player to move along the longitudinal axis of the guiding rod. The base that connects with one end of the guiding rod arranges with at least: an receiving slot arranged to one surface of the base has an appropriate depth to provide one end of the guiding rod to be placed in, an opening arranged at an appropriate position under the receiving slot, and a deformation portion arranged at the upper portion of the base has an appropriate thickness. The fastening device can connect with the base to provide a fixation for the guiding rod.

13 Claims, 4 Drawing Sheets

GUIDING MECHANISM FOR SUPPORTING A READING-HEAD MOVING WITHIN A OPTICAL STORAGE CARRIER PLAYER

BACKGROUND OF THE INVENTION

1. Field of the Invention

The present invention relates to a guiding mechanism disposed within an optical storage carrier player, especially to kind guiding mechanism with an opening or a deformation portion formed on the base to prevent the upward bending of the center portion of the guiding-rod.

2. Background of the Invention

Recently, because the techniques of electronics relevant industry are progressing daily, the practical application of relevant technique of the optical storage carrier player is also more prevalent. Especially, the storing equipment of a optical storage carrier player is forging toward high-speed era and requires high speed for storing and retrieving data.

Under the requirement of high rotating speed of a optical storage carrier player, the quality of the driving mechanism of the optical reading-head will severely influences the speed and stability of the data storage and reading process. Please refer to FIG. 1, which is an illustration for driving mechanism of screw-rod type of prior optical storage carrier player. The intended-to-action CD (not shown in the drawing) applies a main axis motor 10 arranged on the base plate 1 to drive itself. The driving mechanism 30 has a driving motor 31, and a gear set 32 connecting to a screw transmission rod 33 that passes through the reading-head 20, the reading-head 20 is used to read the CD data. The screw-transmission rod 33 passes through one side of the reading-head 20 to receive the driving force provided by the screw-transmission rod 33; and the guiding mechanism 50 passes through the other side of the reading-head 20. Because the rotation of the driving motor 31 drives the gear set 32 to make the screw-transmission rod 33 rotate and transmit, the reading-head 20 can move along the longitudinally axis of the guiding mechanism 50 for reading the CD data.

Please refer to FIG. 2, which is an illustration for the rack-typed-driving mechanism for the prior optical storage carrier player. The intended-to-move CD (not shown in the drawing) is driven by a main-axis motor 10 arranged on a base plate 1. And the driving mechanism 30 has a driving motor 31. The driving motor 31 drives a rack set 34 with a gear set 32. And the reading-head 20 is then applied for reading the CD data. One side of the reading-head 20 arranges with a moving seat 35 that is connected to rack set 34 and rides over a guiding mechanism 50. And another side passes through a guiding mechanism 50. Since the driving motor 31 rotates, drives the gear set 32, and makes the racket 34 move, so the reading-head 20 is driven to move along the longitudinal axis of the guiding rod of the guiding mechanism 50 for reading the CD data.

From above-mentioned prior art, we know that the stability of a optical reading-head 20 when the reading-head 20 is moving along the guiding mechanism 50 will influence the speed and stability of storing and reading the CD data. Please refer to FIG. 3, which is an embodiment illustration for the prior guiding mechanism. Because in prior driving-device, the screw rod type and the rack type individually have one set and two sets guiding mechanism 50, in order to understand easily and without confusion, one set guiding mechanism will be chosen for illustration.

The guiding mechanism 50 arranges with a guiding rod 51 that is a round rod can provide a reading-head 20 to move along an longitudinal axis of the guiding rod 51. One end of the guiding rod is placed on an receiving slot 531. The receiving slot 531 is arranged on a base 53. One side of the base 53 is arranged with an appropriate depth and becomes the receiving slot 531. A fastening device 52 is corresponding to the base 53 and can connect with the base 53. When the guiding rod 51 is placed on the receiving slot 531, the fastening device attached onto the base 53 to press the guiding rod 51 toward the receiving slot 531.

If the depth of the receiving slot 531 is designed larger than the height of the round rod, a gap will be created when the fastening device connects with the base 53, and it will make the guiding rod swing and shake in the receiving slot 531. Of course, the movement of the reading-head 20 is relatively unstable and creates a big barrier for reaching the high-speed requirement of a optical storage carrier player.

On the other hand, if the depth of the receiving slot 531 is designed smaller than the height of the round rod, it will cause the center portion of the guiding rod bending upward when the fastening device 52 presses the end of the guiding rod toward the base 53. When the reading head 20 moves, this situation will cause a wearing-out of the guiding rod 51 or a unstable movement of the reading head 20, or even can cause a machine failure or damage.

Therefore, the design or manufacture personnel usually devote a large amount of cost to improve the matching tolerance between the guiding rod 51 and the receiving slot 531. But because the frequent changes of surrounding temperature and frequency make the materials inflate in hot temperature and shrink in cold temperature, the problems of gap and upward bending happen all the time. These problems influence the driving speed of the reading-head and further severely influence the reading quality and efficiency of a optical storage carrier player, therefore a solution for this shortcoming is very urgent.

SUMMARY OF INVENTION

The main object of the present invention is to provide a guiding mechanism, through a structure improvement of a base to reach a smooth application of a guiding mechanism, the driving speed of a reading-head can be further improved and the reading quality and efficiency of the optical storage carrier player will become the best one.

To achieve above-mentioned objects, a guiding mechanism of the present invention includes: (a) a guiding rod for supporting a reading-head sliding thereon along a longitudinal axis of the guiding rod, the guiding rod having a first end and a center portion, (b) a base for supporting the first end of the guiding rod, the base having a receiving slot formed on a upper surface of the base, and a V-shaped opening formed on a bottom surface of the receiving slot, (c) a fastening device disposed on the base for pressing the guiding rod toward the receiving slot, and (d) a deformation portion formed on the upper surface of the base.

In order to prevent an upward bending of the center portion, the combination of a first height of the deformation portion and a depth of the receiving slot is larger than a second height of the guiding rod.

The deformation portion comprises an U-shaped portion and a circled portion formed on the upper surface of the base. The first end of the guiding rod is disposed beneath the U-shaped portion, and the fastening device is disposed on the circled portion.

When the first end of the guiding rod being pressed toward the receiving slot by the fastening device, (a) the first end of the guiding rod is positioned above the opening, and (b) the first height of the deformation portion is simultaneously reduced by the fastening device to make the fastening device firmly press the first end of the guiding rod.

For your esteemed review committee members to further understand and recognize the present invention, a detailed description matching with several drawings is presented as following.

DETAILED DESCRIPTION OF A PREFERRED EMBODIMENT

The major characteristic of the guiding mechanism of the present invention is that an opening or a deformation portion formed on the base, and the opening or the deformation portion can absorb the shear force causing the upward-bending of the center portion of the guiding rod when attaching the base and the fastening device. The present invention can improve the driving speed of a reading-head and making the reading quality and efficiency of a optical storage carrier player.

Figure 1:
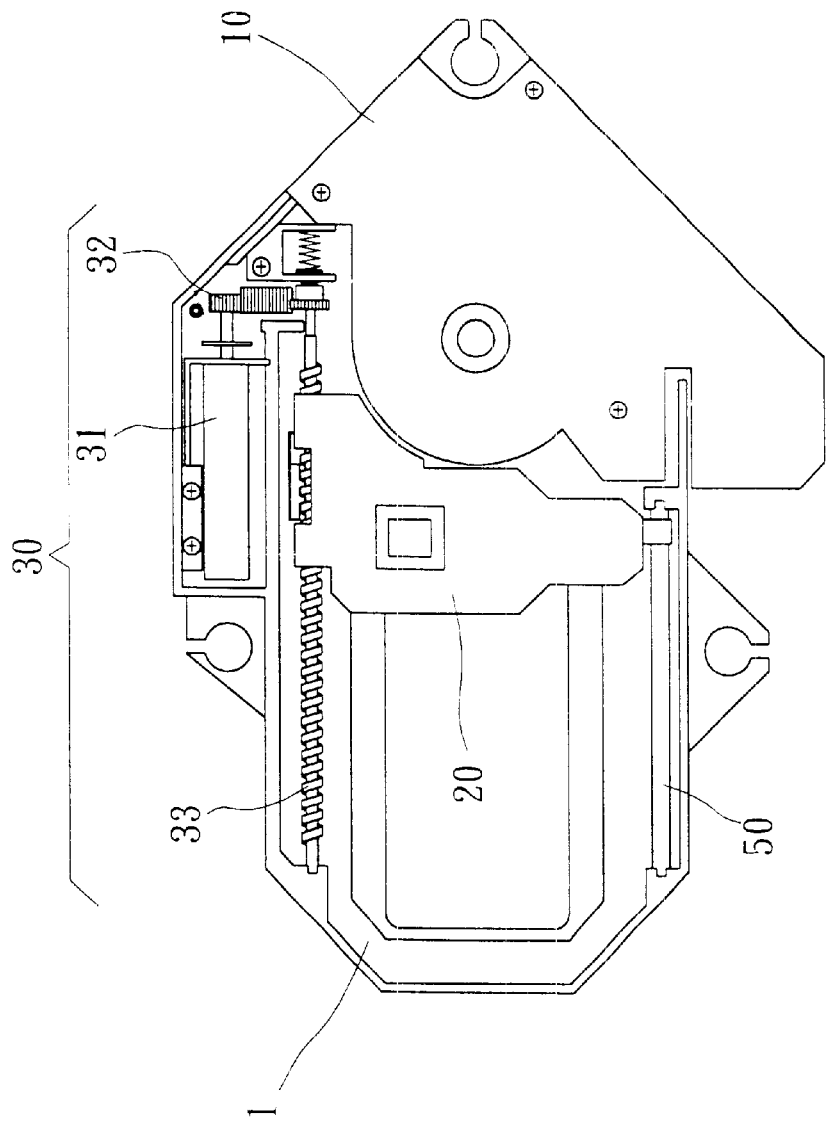
FIG. 1 is an illustration for a screw-rod-type-driving mechanism of a conventional optical storage carrier player.
Figure 2:
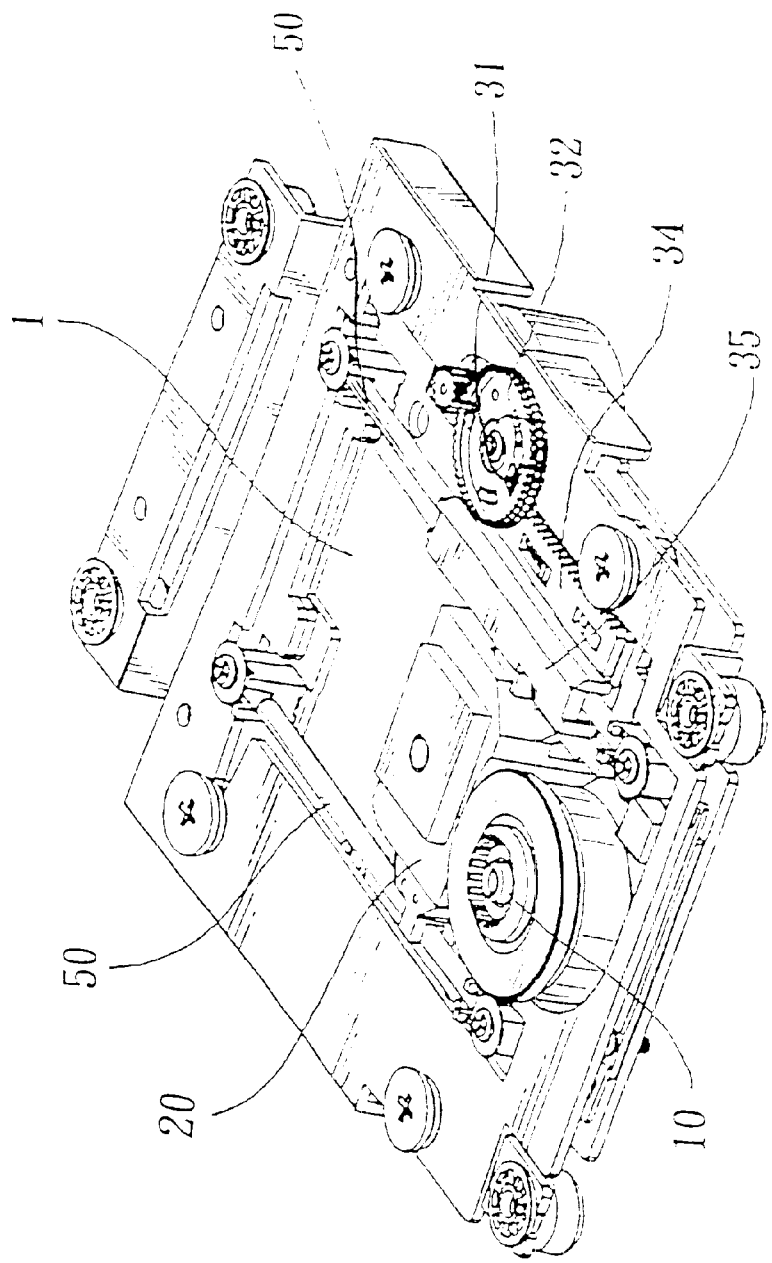
FIG. 2 is an illustration for a rack-type-driving mechanism of a prior optical storage carrier player.
Figure 3:
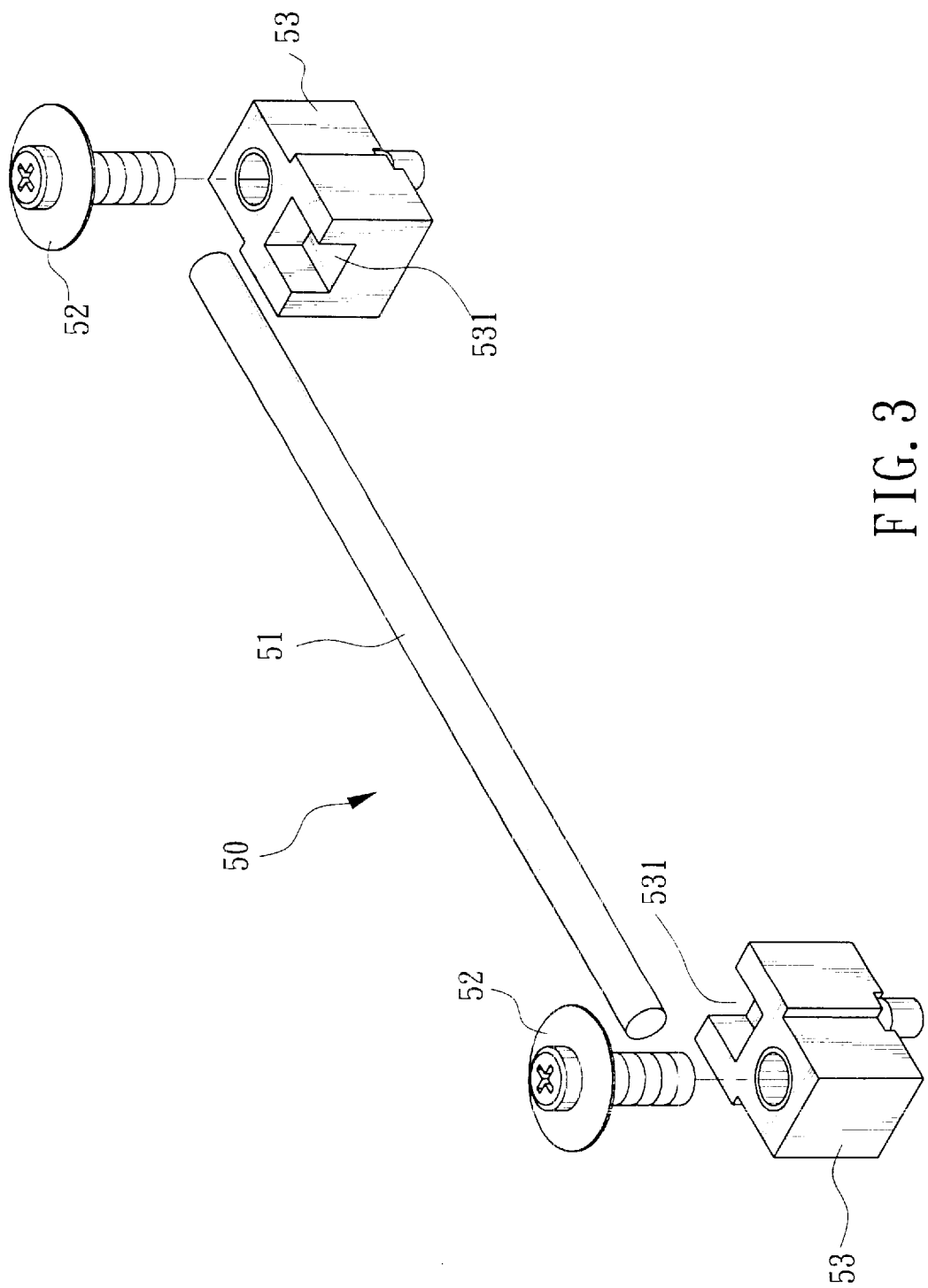
FIG. 3 is an embodiment illustration for a conventional guiding mechanism.
Figure 4:
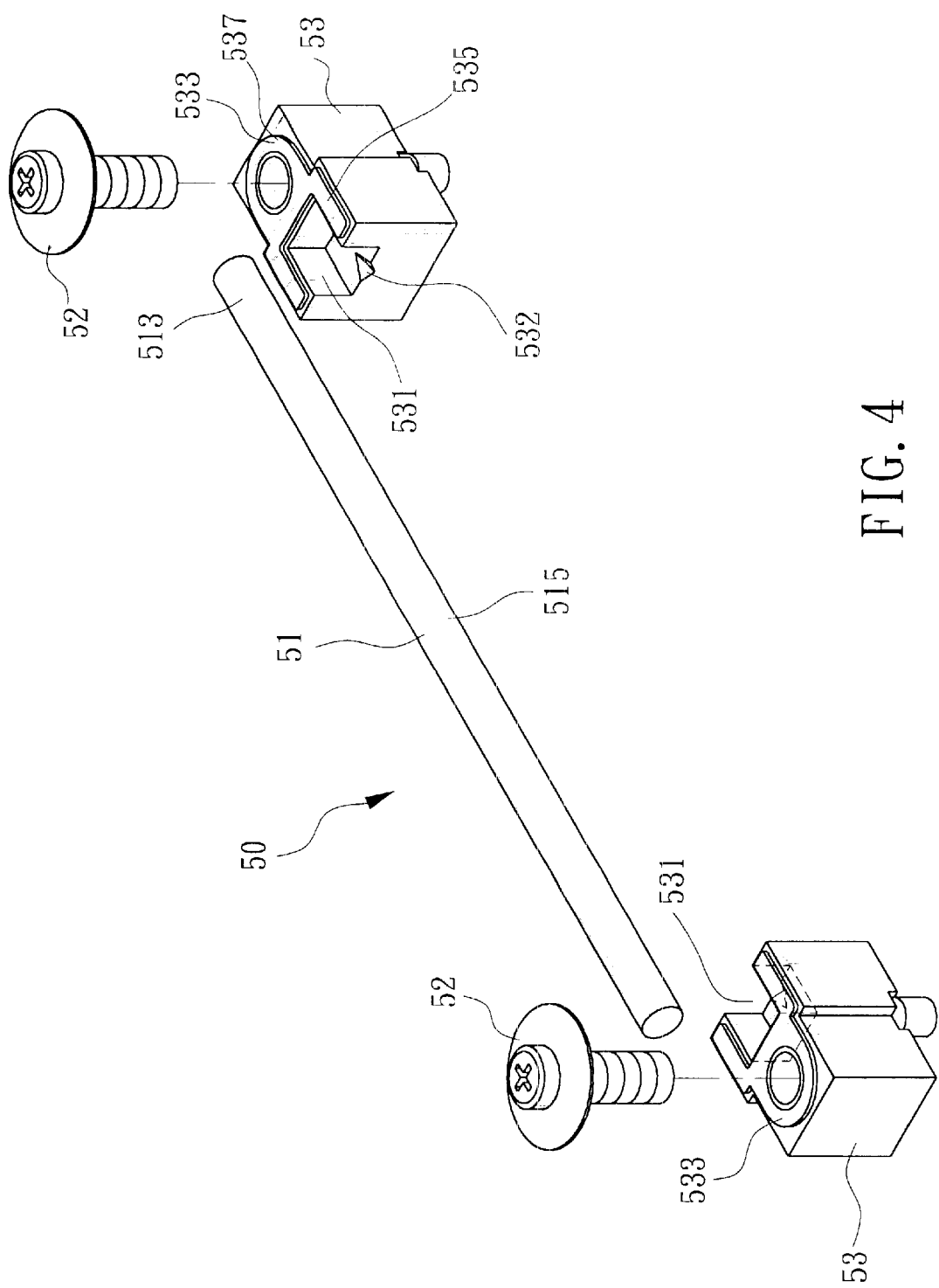
FIG. 4 is a structure illustration of a preferable embodiment of a guiding mechanism of the present invention.

Please refer to FIG. 4, which shows a structure illustration for the preferable embodiment of a guiding mechanism of the present invention. Wherein the guiding mechanism 50 includes: at least a guiding rod 51, at least a base 53, and a fastening device 52.

The guiding rod 51 is a round rod for supporting the reading-head 20, and the guiding rod 51 has a first end 513 and a center portion 515.

There should be one guiding rod disposed within the optical storage carrier player when the guiding rod 51 is a screw-rod-type driving mechanism. There should be one guiding rod disposed within the optical storage carrier player when the guiding rod 51 is a rack-type driving mechanism. Of course, the number can be more according to different driving mechanism designs. The reading-head 20 can slide on the guiding rod 51 along the longitudinal axis of the guiding rod 51.

The base 53 supports the first end of the guiding rod 51, of which two ends each arranges with a base 53 that props up the guiding rod 51 to an appropriate altitude. The base 53 arranges with an receiving slot, an opening 532 and a deformation portion 533. The receiving slot 531 and the deformation portion 533 are formed on the upper surface of the base 53, and the V-shaped opening 532 is formed on the bottom surface of the receiving slot 531. Besides, the opening 532 is formed on the center of the bottom surface, so the opening 532 is positioned right below the center of the guiding rod 51.

The receiving slot 531 has an appropriate depth to substantially receive the first end 513 of the guiding rod 51. The appropriate depth is slightly smaller than the height of the guiding rod 51. The deformation portion 533 is formed on the upper surface of the base 53 with certain thickness. The combination of the first height of the deformation portion 533 and the depth of the receiving slot 531 is slightly larger than the diameter of the guiding rod 51. When the first end 513 of the guiding rod 51 is pressed toward the receiving slot 531 by the fastening device 52, the first height of the deformation process 533 is simultaneously reduced by the fastening device 52. Therefore, the fastening device 52 can firmly press the first end 513 of the guiding rod 51.

The area of the deformation portion 533 is slightly smaller than the area of the upper surface of the base 53. The deformation portion 533 comprises an U-shaped portion 535 and a circled portion 537. The first end 513 of the guiding rod 51 is disposed beneath the U-shaped portion 535, and the fastening device 52 is disposed on the circled portion 537.

The deformation portion 533 and the base 53 can be integrally formed by plastic material. Of course, the deformation portion 533 and the base can also be two independent parts and then combined together later. The materials of the deformation portion 533 can be plastic, rubber, silica gel or other composite. When the fastening device 52 are pressing on and locking up, the deformation portion 533 can provide a slight deformation to make the fastening device 52 contacts with and lock up the guiding rod 51. Through the deformation to absorb the shear force and stress force generated in the rotation and fastening procedures of the fastening device 52, the shear force and stress force will not be transferred to the guiding rod 51 and the upward bending of the center portion 515 of the guiding rod 51 can be avoided.

The detailed situation of how the fastening device 52 is attached onto the base 53 and pressing the guiding rod 51 toward the receiving slot 531 is explained below. (1) The guiding rod 51 is placed in the receiving slot 531. (2) First, the fastening device 52 contacts with the deformation portion 533, because the combination of the thickness of the deformation portion 533 and the depth of the receiving slot 531 is slightly larger than the diameter of the guiding rod 51. (3) An elastic deformation occurred to the deformation portion 533 to make the fastening device 52 can firmly press the first end 513 of the guiding rod 51, when the fastening device 52 continuously applies force downward and presses on the deformation portion 533.

The opening 532 of "V"-shape can reduce the shear force and stress force generated from the base plane of the receiving slot 531, transfer and release the shear force and stress force that are generated from the fastening device 52 and applied onto the guiding rod 51, and prevent the upward bending of the center portion 515 of the guiding rod 51.

The above guiding mechanism of the present invention can indeed reach the effect of preventing the guiding rod from projecting upward, easily enhance and stabilize the driving speed of the reading-head to reach the optimum reading quality and efficiency of a optical storage carrier player, really overcome the shortcoming of the prior art, satisfy the needs of the industries, and finally promote their production competition.

What is claimed is:

1. A guiding mechanism disposed within an optical storage carrier player, the guiding mechanism comprising:
   at least one a guiding rod for supporting a reading-head to slide thereon along a longitudinal axis of the guiding rod, the guiding rod having a first end and a center portion;
   at least one base for supporting the first end of the guiding rod, the base having a receiving slot formed on a upper surface of the base, and a deformation portion formed on the upper surface of the base; and
   a fastening device disposed on the base for pressing the guiding rod toward the receiving slot;

wherein the combination of a height of the deformation portion and a depth of the receiving slot is larger than a diameter of the guiding rod, when the first end of the guiding rod being pressed toward the receiving slot by the fastening device, the height of the deformation portion is simultaneously reduced by the fastening device to make the fastening device firmly press the first end of the guiding rod.

2. The guiding mechanism of claim 1, wherein the diameter of the guiding rod is larger than the depth of the receiving slot.

3. The guiding mechanism of claim 1, wherein the deformation portion further comprising an U-shaped portion and a circled portion, the first end of the guiding rod is disposed beneath the U-shaped portion, and the fastening device is disposed on the circled portion.

4. The guiding mechanism of claim 1, wherein the deformation portion and the base are integrally formed.

5. The guiding mechanism of claim 1, wherein the deformation portion is made of the materials of rubber, silica gel and plastic.

6. The guiding mechanism of claim 1, wherein the base further comprising an opening formed on a bottom surface of the the receiving slot, when the first end of the guiding rod being pressed toward the receiving slot by the fastening device, the first end of the guiding rod being positioned above the opening to prevent an upward bending of the center portion.

7. The guiding mechanism of claim 6, wherein the opening is V-shaped.

8. A guiding mechanism disposed within an optical storage carrier player, the guiding mechanism comprising:
   at least one guiding rod for supporting a reading-head to slide thereon along a longitudinal axis of the guiding rod, the guiding rod having a first end and a center portion;
   at least one base for supporting the first end to the guiding rod, the base having a receiving slot formed on a upper surface of the base, and an opening formed on a bottom surface of the receiving slot,
   a deformation portion formed on the upper surface of the base,
   a fastening device disposed on the base for pressing the guiding rod toward the receiving slot,
   wherein the first end of the guiding rod being positioned above the opening to prevent an upward bending of the center portion, the combination of a height of the deformation portion end a depth of the receiving slot is larger than a diameter of the guiding rod, when the first end of the guiding rod being pressed toward the receiving slot by the fastening device, the height of the deformation potion is simultaneously reduced by the fastening device to make the fastening device firmly press the first end of the guiding rod.

9. The guiding mechanism of claim 8, wherein the deformation portion and the base are integrally formed.

10. The guiding mechanism of claim 8, wherein the deformation portion is made of the materials of rubber, silica gel and plastic.

11. The guiding mechanism of claim 8, wherein the deformation portion further comprising an U-shaped portion and a circled portion, the first end of the guiding rod is disposed beneath the U-shaped portion, and the fastening device is disposed on the circled portion.

12. The guiding mechanism of claim 8, wherein the opening is formed on the center of the bottom surface, and the opening is positioned right below a center of the guiding rod.

13. A guiding mechanism disposed within an optical storage carrier player, the guiding mechanism comprising:
   at least one guiding rod for supporting a reading-head to slide thereon along a longitudinal axis of the guiding rod, the guiding rod having a first end and a center portion;
   at least one base for supporting the first end of the guiding rod, the base having a receiving slot formed on a upper surface of the base, and an opening formed on a bottom surface of the receiving slot, the opening being V-shaped; and
   a fastening device disposed on the base for pressing the guiding rod toward the receiving slot;
   wherein the first end fo the guiding rod being pressed toward the receiving slot by the fastening device, the first end of the guiding rod being positioned above the opening to prevent an upward bending of the center portion.

* * * * *